A. B. LANDIS.
CLUTCH MECHANISM.
APPLICATION FILED FEB. 9, 1918.
1,437,319.
Patented Nov. 28, 1922.
2 SHEETS—SHEET 1.
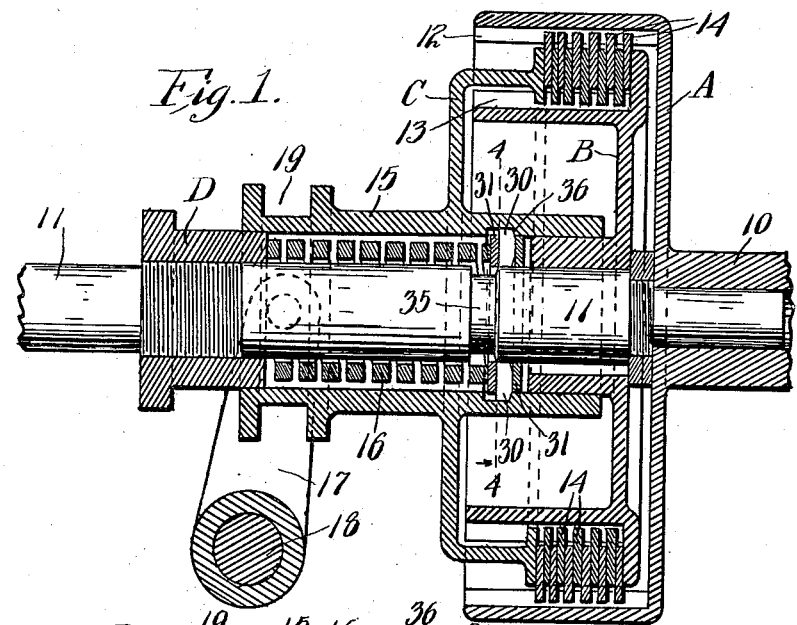
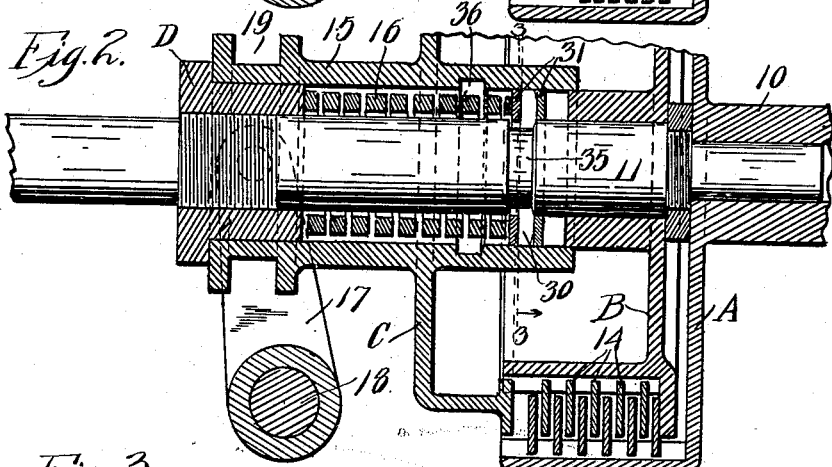
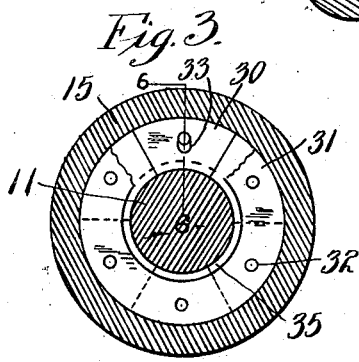
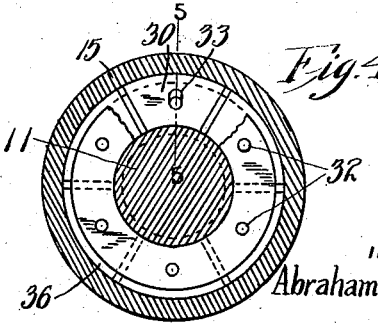
INVENTOR
Abraham B. Landis.
BY Bradford & Doolittle,
ATTORNEYS.

A. B. LANDIS.
CLUTCH MECHANISM.
APPLICATION FILED FEB. 9, 1918.
1,437,319.
Patented Nov. 28, 1922.
2 SHEETS—SHEET 2.
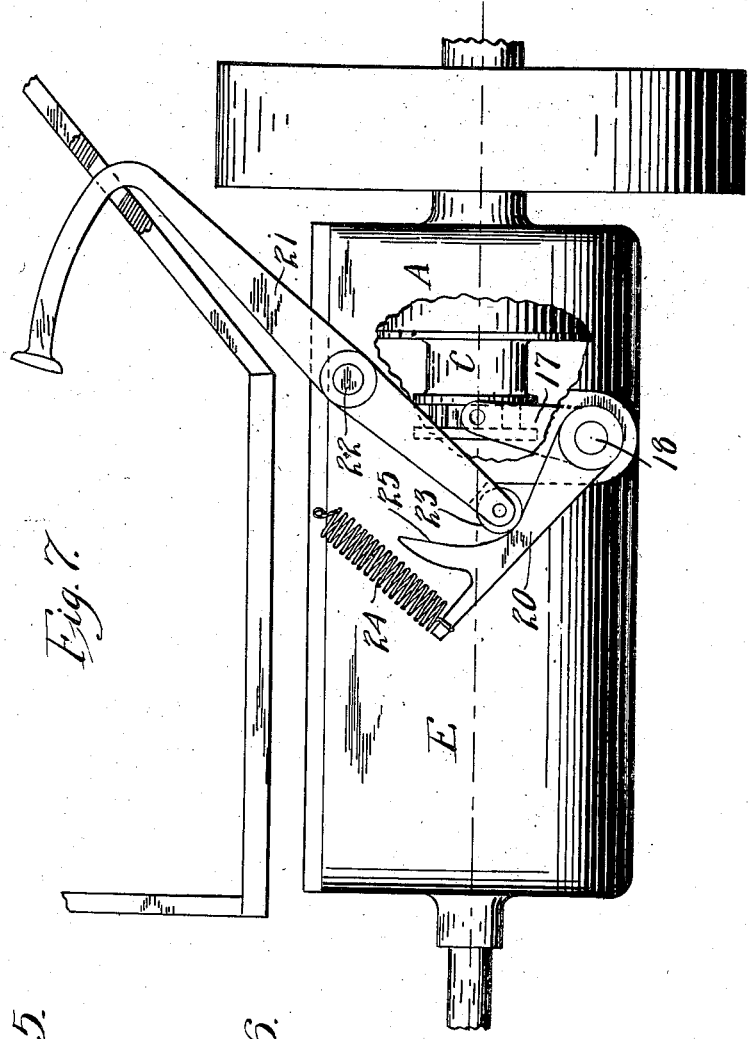
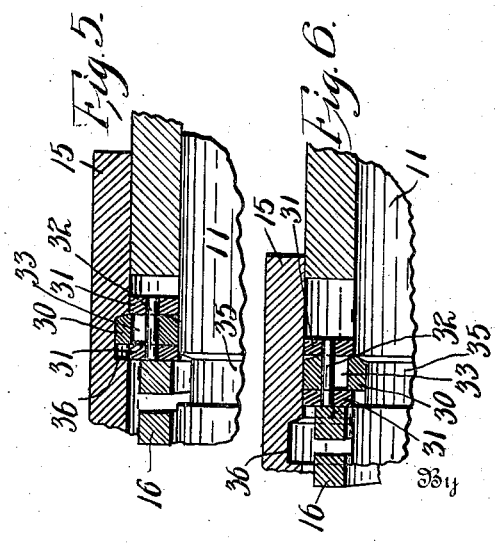
Inventor
Abraham B. Landis.
By Bradford & Doolittle
Attorneys Patented Nov. 28, 1922.

1,437,319

UNITED STATES PATENT OFFICE.

ABRAHAM B. LANDIS, OF ENFIELD, PENNSYLVANIA.

CLUTCH MECHANISM.

Application filed February 9, 1918. Serial No. 216,210.

*To all whom it may concern:*

Be it known that I, ABRAHAM B. LANDIS, a citizen of the United States, residing at Enfield, Montgomery County, and State of Pennsylvania, have invented and discovered certain new and useful Improvements in Clutch Mechanism, of which the following is a specification.

My said invention relates to frictional clutches and more especially to those of the multiple disk type and particularly such as for automobile use.

The device embodies the method of the conventional clutch in which the frictional disks are held in driving contact by a spring, but consists of an improvement in which by the releasing of the frictional surfaces by means of a lever or foot pedal, (as used in automobiles) the said spring is but slightly compressed in releasing its frictional disks or elements from driving action when the spring tension is released from the said frictional elements and transferred on to the shaft on which the clutch is mounted, and the further parting of the frictional surfaces is accomplished without the resistance of the spring, making the parting of said surfaces to an amount necessary for freedom of motion between them to prevent lagging of the clutch, and making the said movement in accomplishing this result one of extreme ease—a much desired feature in automobile driving. In ordinary practice, to part the frictional surfaces to the extent desired and necessary to prevent dragging, this spring requires to be compressed very much beyond the normal pressure required to hold the required driving friction making it a more or less laborious and objectionable feature. My said invention overcomes this objection and makes the clutch action one of extreme ease, all as will be hereinafter more fully described and claimed.

Referring to the accompanying drawings which are made a part hereof, and on which similar reference characters indicate similar parts—

Figure 1 is a longitudinal cross section of a clutch showing it closed;

Figure 2 a like section showing the clutch open;

Figure 3 a cross section on the line 3—3 of Figure 2;

Figure 4 a cross section on the line 4—4 of Figure 1;

Figure 5 a cross section on the line 5—5 of Figure 4;

Figure 6 a cross section on the line 6—6 of Figure 3, and,

Figure 7 a side elevation of a casing containing said clutch as it would be mounted in an automobile showing the arrangement of lever and foot pedal for operating said clutch.

A represents a bell or driving element provided with a hub 10 to which is attached a source of power. A driven shaft 11 has one end journalled in the hub 10 of the bell A. Mounted within the bell A and keyed to the shaft 11 is the driven element B. The bell A is provided on the inside of its flange with a series of keys 12 while the element B has a similar number of keys 13 mounted on the outside of its flange. These keys engage key-ways formed in alternately disposed disks 14 common to all disk clutches. A pressure plate C is provided with a hub 15 and is adapted to slide longitudinally in line with the shaft 11. This plate serves to force the disks 14 into frictional contact as will be readily seen. The hub 15 has a circumferential groove 19 at its end in which operate two segmental shoes which are pivoted to the ends of a yoked arm 17 which is secured to a shaft 18 journalled in a casing E. On the outer end of the shaft 18 is secured an arm 20 with which is engaged the pedal lever 21 pivoted at 22 on the side of the casing E. Mounted in the lower end of the lever 21 is a roller 23 which engages the curved portion 25 of the arm 20. This portion 25 is of a form to cause a very slow movement of the arm 20 during the first portion of the movement of the lever 21 and a rapid movement during its final movement for a purpose to be explained later. A light spring 24 is secured to the outer end of the arm 20 and to the casing E to return the arm 20 on the release of the pedal 21.

The shaft 11 is provided with a circumferential groove 35 and the hub 15 has an internal annular groove 36 which are both beveled on one side only and which are designed to be alternately engaged by a collar 30 formed of a series of segments to permit of its expansion and contraction. This collar 30 is confined between two circular plates 31 through which the shaft 11 projects. Each segment of the collar 30 is provided with a slot 33 through which projects a pin 32 secured at its ends in the plates 31 respectively, thereby insuring free radial movement of the segments while confining them to a given space.

A spring 16 which gives the required pressure to the disks 14 for driving action, encircles the shaft 11 and is located within the hub 15. One end of said spring bears against a collar D which is threaded on the shaft 11 for the purpose of adjusting the tension while the other end impinges against the adjacent ring 31 which confines the collar 30 thereby causing it to engage either of the grooves 35 or 36. The beveled side of each of said grooves is of such angle that the collar 30 will not quite repose when free to move out of said gooove by the pressure of the spring 16, so that the pressure on the segmental collar will produce very little pressure against the shaft 11 and hub 15 when it slides against either.

In Figure 1 the clutch is shown closed, the pressure of the spring 16 exerting its load on the frictional disk surface as the collar 30 is engaged with the hub 15 of the pressure plate C as will be seen and therefore said clutch is in driving condition. When the pressure plate is withdrawn from the frictional disks through the means of the lever and arms already described the hub 15 is slid outwardly for a very short distance when the segmental collar 30 will coincide with the groove 35 in shaft 11 and due to the non-repose angle of the groove 36 said segment by the pressure of spring 16 will slide out of groove 36 into groove 35 of shaft 11 when the spring thrust will be taken on the beveled shoulder of groove 35 and there held stationary while the hub of pressure plate C will continue to move outwardly without any of the pressure of spring 16 to a wider opening of the frictional surface and without any resistance. Inversely when closing the clutch, pressure plate C will slide into engagement by means of the light spring 24 until the annular groove 36 in the hub registers with the segmental collar now engaging with the groove 35 in shaft 11 when the pressure of spring 16 due to the bevel sides of groove 35 and beveled surface of the segment collar will slide from groove 35 into groove 36 of the hub 15 and lodge the spring pressure of spring 16 onto the pressure plate C which then receives the load of said spring.

It will be noted that the movement of pressure plate C is very small until the collar 30 is transferred to engagement with shaft 11 and the spring pressure released therefrom and due to the curve 25 of arm 20 the lever 21 will move through quite a distance until this spring pressure is relieved from the pressure plate and after said pressure has been relieved the curve 25 of arm 20 then will cause a quick movement of the pressure plate permissibly due to relief of the load of the spring 16 and thereby a fairly even light load will be required on pedal or lever 21 throughout its movement.

Having thus fully described my said invention what I claim as new and desire to secure by Letters Patent is:

1. In a frictional clutch, the combination of a shaft, a driving element and a driven element, inter-engaging elements with friction surfaces between said driving and driven elements, a pressure plate, a spring arranged to bear against a part of said pressure plate for controlling the pressure upon said frictional surfaces, and means by which the engagement of said spring with said pressure plate is transposed therefrom to the shaft by the act of retracting the same from said inter-engaging elements, whereby said pressure plate is left free for further movement, substantially as set forth.

2. In a frictional clutch, the combination of a shaft, a driving element and a driven element, inter-engaging elements with friction surfaces between said driving and driven elements, a pressure plate comprising a sliding sleeve, a spring arranged to exert pressure against said sleeve for controlling the pressure upon said surfaces, and means by which the engagement of said spring with said sleeve is transposed to the said shaft leaving the pressure plate free from any pressure due to said spring.

3. In a friction clutch, the combination of a shaft, a driving element and a driven element, inter-engaging frictional disks carried by said elements respectively, a pressure plate embodying a sliding part, a spring by which pressure is produced upon said disks through said sliding part, means by which in releasing said pressure plate from said disks said spring pressure is disengaged from said sliding part and then held at both ends by said shaft, substantially as set forth.

4. In a frictional clutch the combination of a shaft, a driving element, a driven element, frictional disks connecting said elements, a pressure plate, a spring to exert pressure upon said plate, a recess in said shaft, a recess in the hub of said pressure plate, a sectional collar upon which said spring exerts its force, means by which said sectional collar is transposed from the recess in said pressure plate to the recess in the shaft and vice versa, substantially as set forth.

5. A frictional clutch comprising inter-engaging elements with frictional surfaces, a pressure plate embodying a sliding part, a spring arranged to act against said sliding part by which said pressure plate holds the frictional surfaces in contact, and means by which in slightly separating said frictional surfaces said spring pressure is totally relieved from said pressure plate permitting further motion of the pressure plate entirely free from any pressure of said spring, substantially as set forth.

6. A frictional clutch comprising inter-engaging elements with frictional surfaces, a pressure plate, a spring engaging said pressure plate by which the pressure of said spring holds said frictional surfaces in contact, means by which said spring pressure by its release from said frictional surfaces is released from said pressure plate and sustained by said shaft, and its further compression is stopped while the said pressure plate moves to a further position giving large space between said frictional surfaces, substantially as set forth.

7. A frictional clutch comprising a shaft, driving and driven elements, inter-engaging elements with frictional surfaces through which said elements are connected, a spring by which said frictional surfaces are held in driving contact, a pressure plate having a central perforation, an annular groove in said perforation, an annular groove in said shaft, a segmental collar adapted to alternately engage said grooves respectively when said pressure plate is moved a short distance to transpose the pressure of said spring from said pressure plate to said shaft and vice versa, substantially as set forth.

8. In a frictional clutch, the combination of a shaft, a driving and a driven element, inter-engaging frictional disks carried on said elements respectively, a pressure plate secured to a sliding sleeve, a spring having one end bearing at all times against the shaft and its other end arranged for actuating said pressure plate to hold said disks engaged, and means by which the retraction of the pressure plate operates to remove all of said spring pressure therefrom and lodge it upon the shaft, substantially as set forth.

9. In a frictional clutch, the combination of a shaft having a recess, driving and driven elements, frictional engaging parts by which said elements are given driving connection, a spring through which pressure is exerted to hold said frictional parts engaged, a sectional collar through which said spring transmits its pressure, means by which said collar may be disengaged from the frictional member and engaged with said recess in the shaft, whereby the pressure of said spring is transferred to said shaft, substantially as set forth.

In witness whereof, I have hereunto set my hand and seal at Philadelphia, Pennsylvania this twenty-third day of January, A. D. nineteen hundred and eighteen.

ABRAHAM B. LANDIS. [L. S.]

Witnesses:
MARY M'CALLA,
ALEX. S. GROVES.